Dec. 21, 1965 A. C. KIRILOUCKAS 3,225,233

CAPSTAN DRIVE MECHANISM

Filed Jan. 8, 1963 2 Sheets-Sheet 1

INVENTOR:
Albert C. Kirilouckas
By Keith D. Beecher
Attorney

Dec. 21, 1965 A. C. KIRILOUCKAS 3,225,233

CAPSTAN DRIVE MECHANISM

Filed Jan. 8, 1963 2 Sheets-Sheet 2

INVENTOR:
Albert C. Kirilouckas
By Keith D. Beecher
Attorney

United States Patent Office 3,225,233
Patented Dec. 21, 1965

3,225,233
CAPSTAN DRIVE MECHANISM

Albert C. Kirilouckas, Los Angeles, Calif., assignor to Winston Research Corporation, Los Angeles, Calif., a corporation of California Filed Jan. 8, 1963, Ser. No. 250,084
3 Claims. (Cl. 310—154)

The present invention relates to magnetic tape recorders, and the like; and the invention is especially concerned with an improved capstan drive mechanism for use in a magnetic tape recorder, and similar mechanisms, to drive the recording medium in such a recorder along a particular path.

It is usual in the prior art magnetic tape recorders to draw a magnetic recording tape along a predetermined path from a pay-off reel to a take-up reel. Suitable electro-magnetic recording and reproducing heads are disposed adjacent the path to record information on the magnetic tape, and also to sense information recorded on the tape.

It is also usual in the prior art magnetic tape recorders to draw the magnetic recording tape along the particular path by means of a rotatable capstan. The capstan is positioned on one side of the path; and a rotatable idler puck, positioned on the opposite side of the path, may be moved against the tape to press the tape against the drive capstan. This enables the drive capstan to engage the tape with sufficient frictional force so that it may drive the tape along its predetermined path.

A drive motor is mechanically coupled to the drive capstan in the prior art tape recorder to impart rotational movement thereto. In this manner, the drive capstan is capable of drawing the magnetic recording tape along a particular path and across the sensitive surfaces of the electro-magnetic recording and reproducing heads.

Difficulties have been encountered in the past in the construction of suitable capstan drive mechanisms of the general type under consideration. These difficulties have arisen mainly because of the necessity for the capstan to drive the tape at a precisely constant, invariable speed across the sensitive faces of the electromagnetic transducer heads. It is evident that any variation in the speed at which the tape is drawn across the faces of the heads will produce spurious variations in the pitch of the signal recorded on the magnetic tape or reproduced from the tape.

Prior art attempts to overcome the above-mentioned difficulties have resulted in the provision of heavy and expensive drive motors for the capstan, and precise and expensive bearings for mounting the capstan. However, even the more intricate and expensive prior art capstan drive assemblies have not been completely successful in eliminating spurious variations from the speed at which the magnetic tape is drawn across the transducer heads.

An object of the present invention is to provide an improved capstan drive mechanism which is capable of drawing a magnetic tape at a constant and invariable speed across the transducer heads of a magnetic recorder.

A further object is to provide such an improved capstan drive mechanism which is relatively inexpensive and simple to construct.

Another object is to provide such an improved rugged and sturdy capstan drive assembly in which the moving parts are relatively light, and yet are sufficiently rigid so as to eliminate compliances in the capstan drive and the spurious speed irregularities and resulting signal distortions attendant to such compliances.

Another object is to provide such an improved rugged and sturdy capstan drive assembly which is constructed and configured so as to eliminate mechanical resonances in the assembly and speed irregularities caused by such mechanical resonances.

Yet another object of the invention is to provide such an improved capstan drive assembly which is constructed to incorporate a low inertia printed circuit motor and standard bearings, and which is further constructed to incorporate the necessary elements of a speed control system for the motor so that the desired constant speed may be achieved.

A feature of the invention is the provision of such an improved capstan drive assembly which may be rigidly clamped, as will be described, so as to prevent cantilever effects of the capstan which, likewise, have a tendency to produce spurious speed variations in the drive of the magnetic tape.

Another feature of the invention is the provision of such an improved capstan drive assembly which is constructed to impart a drive to the magnetic tape at spaced points along the path of the tape on opposite sides of the transducer heads of the recorder, so as to eliminate any variations in the rate at which the tape is drawn across the transducer heads due to variations in the elasticity of the tape material.

Another object of the invention is to provide such an improved capstan drive mechanism and assembly which may be easily and conveniently assembled and mounted in a magnetic tape recorder, or the like, and which may be fully shielded to prevent spurious recordings on the magnetic tape due to the magnetic field of the drive motor, or the like.

Other objects, features and advantages of the invention will become apparent from a consideration of the following description, when taken in conjunction with the accompanying drawings, in which.

Figure 1:
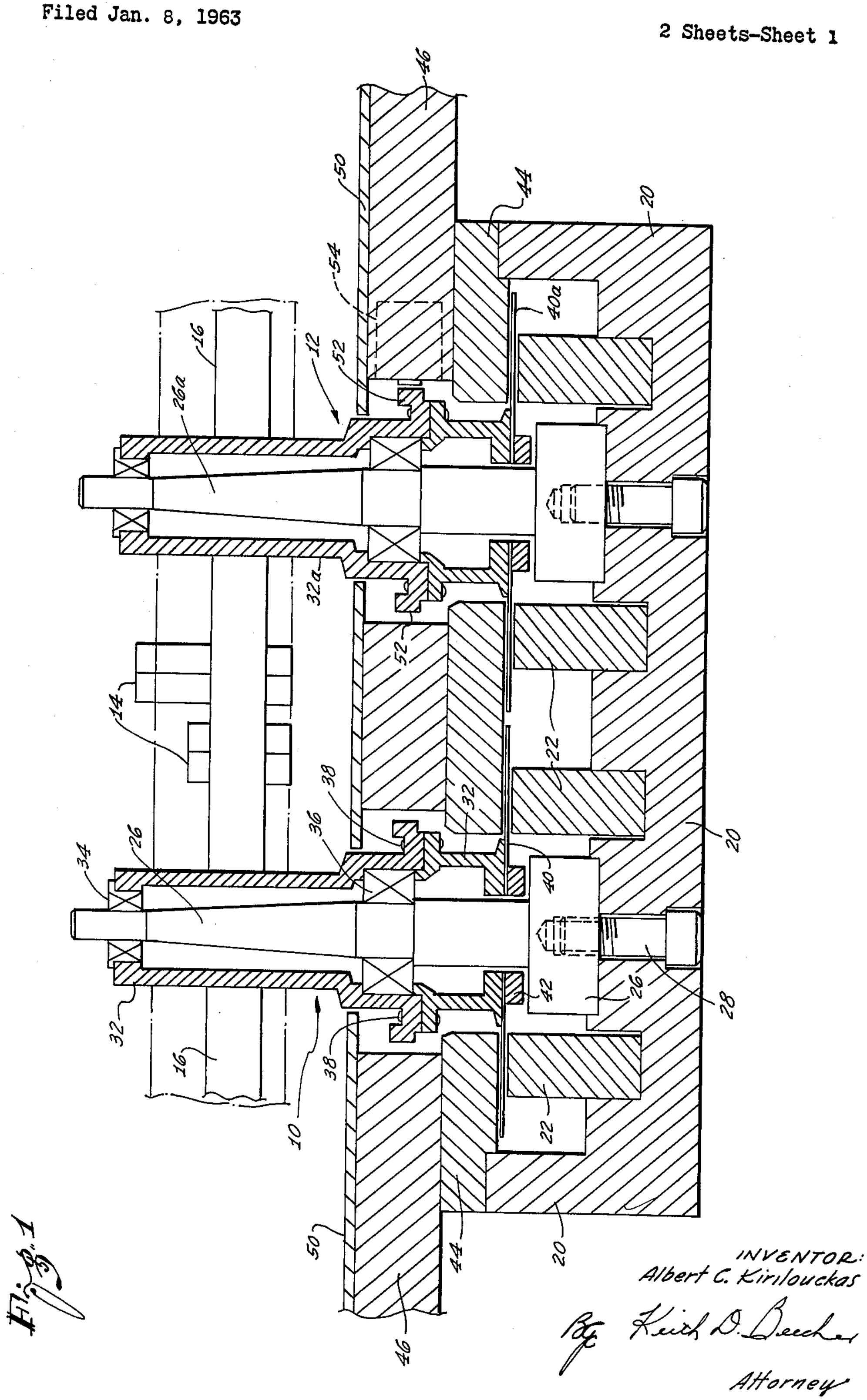
FIGURE 1 is a side sectional view of an improved capstan drive mechanism constructed in accordance with the invention.

The improved capstan drive mechanism of the invention, in the embodiment shown in FIGURE 1, includes a pair of capstan drive assemblies designated 10 and 12. These assemblies are positioned on opposite sides of the transducer heads 14 of the recorder.

This type of dual-type capstan drive assembly serves to impart a drive to the magnetic tape at spaced points along the path of the tape on opposite sides of the transducer heads 14. As mentioned above, the provision of such a capstan drive assembly serves to eliminate any variations in the rate at which the tape is drawn across the transducer heads due to variations in the elasticity of the tape material. The magnetic tape is designated 16 in FIGURES 1 and 3.

The two capstan drive assemblies 10 and 12 are similar in all material respects. For that reason, only the mechanism 10 will be described in detail herein. The mechanism 10 is shown in the exploded view of FIGURE 2. It will be understood, of course, that the mechanism 12 may be similarly constructed.

The capstan drive assembly includes a housing 20 which is formed of a non-magnetic material, such as aluminum.

Figure 2:
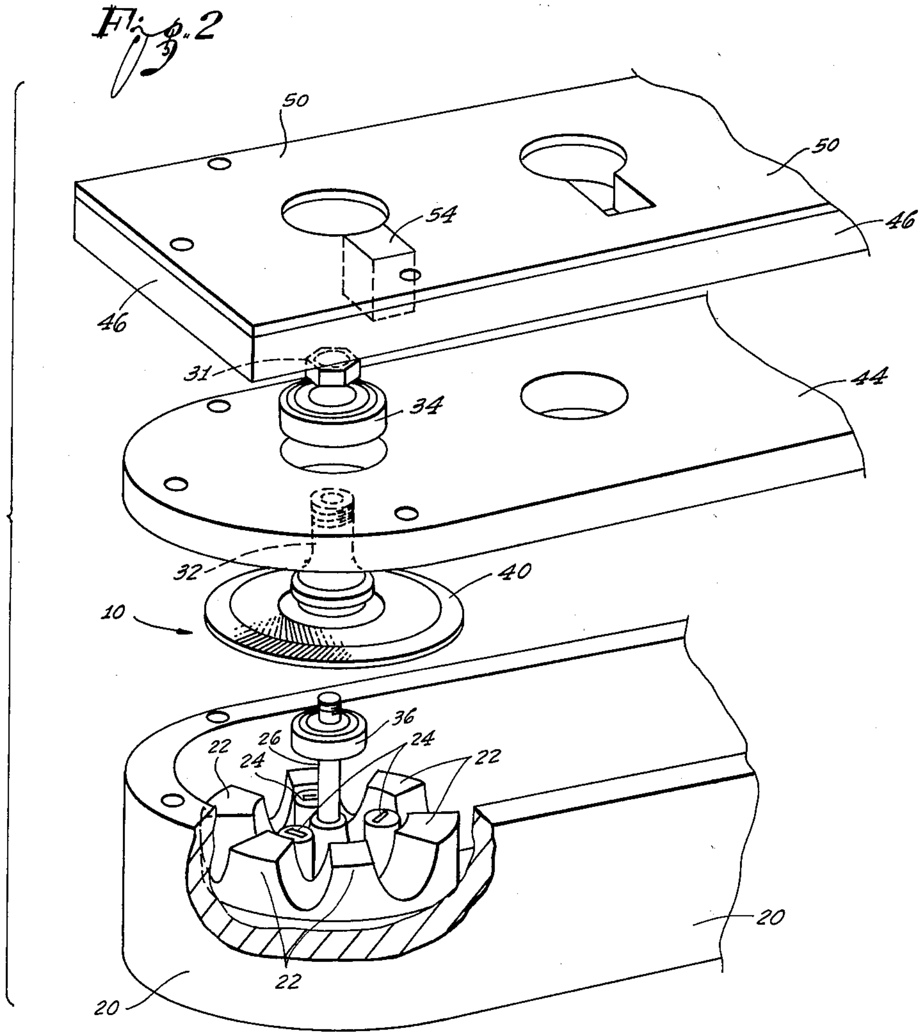
FIGURE 2 is a partial exploded view showing the components of a portion of the drive mechanism of the invention.

A plurality of permanent magnets 22 are mounted in a ring around a particular axis in the housing 20, as best shown in FIGURE 2, for example, and these permanent magnets present alternate magnetic poles at their upper faces. A plurality of commutator brush holders 24 (FIGURE 2) are also mounted in the housing 20 within the confines of the permanent magnets 22.

Figure 3:
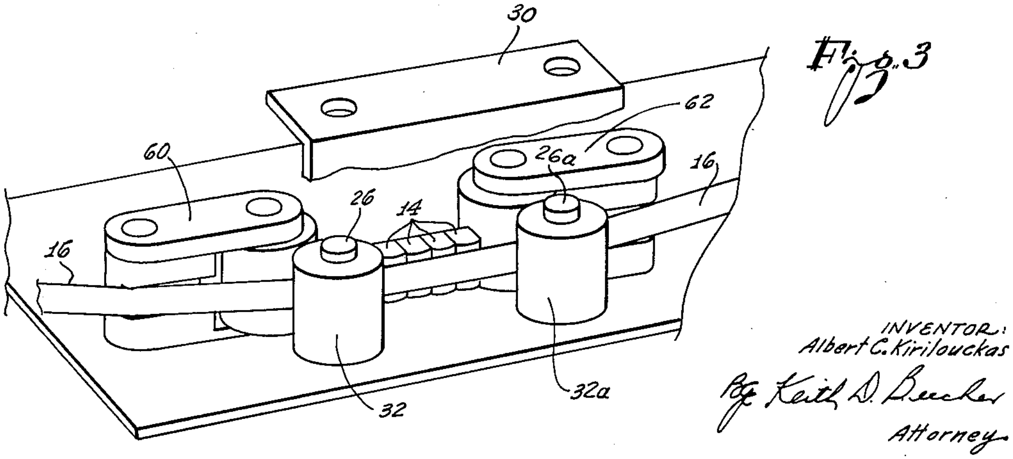
FIGURE 3 is a partial perspective view showing the upper portion of the drive mechanism of the invention and the manner in which it functions to draw a magnetic recording tape across appropriate transducer heads.

A stationary shaft 26 is rigidly supported in the housing, or frame, 20 by means of a bolt 28, and the shaft 26 extends along the particular axis to be surrounded by the permanent magnets 22. The stationary shaft 26 has the configuration illustrated in FIGURE 1, for example, and it is clamped at its threaded outer end by means, for example, of a bracket 30 and a nut 31 (FIGURES 2 and 3).

The stationary shaft 26 is rigidly supported, therefore, by the bolt 28 and by the bracket 30, and all cantilever effects of the capstan drive of the invention are, therefore, eliminated. As mentioned above, these cantilever effects produce unwanted variations in the rate at which the magnetic tape 16 is drawn across the faces of the transducers 14.

A hollow shaft 32 is rotatably supported on the stationary shaft 26 by means of a pair of bearings 34 and 36. The bearing 34 is positioned at the end of the hollow shaft 32, and the bearing 36 is positioned near the lower end of the shaft in FIGURE 1. The shaft 32 is formed of two pieces to facilitate the installation of the shaft. These two pieces are bolted together by bolts 38.

The rotatable hollow shaft 32 is formed of stiff, light material to have a relatively low inertia. The shaft 32 has a rigid body of large diameter, so as to reduce compliance to a minimum and reduce all possible resonance in the shaft within the normal operating speeds.

A printed circuit electric motor armature 40 is clamped to the lower end of the shaft 32 by means of a clamp 42. The lower end of the rotatable shaft 32 forms the rotor for the motor. The permanent magnets 22 form pole pieces for the motor. A plate 44 of magnetizable material is bolted over the top of the housing 20, and this plate forms a return path for the magnetic field of the printed circuit motor.

The printed circuit motor components may be similar to the printed circuit motor produced and sold by Printed Motors, Inc., 33 Seacliff Avenue, Glencove, New York, and described in a publication of that company entitled "A Status Report on the Printed Motor" by R. P. Burr Circuit Research Company.

The printed circuit armature 40 of the motor is energized by brushes held in the brush holders 24, and the resulting magnetic fields react with the permanent magnet pole pieces 22 to impart rotational motion to the rotor of the motor, and to the shaft 32.

A mounting plate 46 is bolted to the plate 44, and this plate serves as a convenient mount for the mechanism in the tape recorder. A magnetic shield 50 is mounted over the plate 46, and this shield serves to insulate the circuitry and heads 14 from the magnetic fields of the drive motor of the mechanism.

The rotatable shaft **32*a* in the right hand mechanism in FIGURE 1, for example, has a rim 52 formed of magnetic material, and a plurality of magnetic recordings are magnetically formed around the rim 52. These recordings may be in the form of discrete pulses placed at equiangular positions around the rim. The recordings on the rim 52 are sensed by an electro-magnetic transducer 54 which is mounted in the plate 46**.

The circuitry associated with the reproducer 54 is used to control the speed of both the shafts 32. If desired, a similar sensor 54 may be associated with the shaft 32 of the left hand portion of the mechanism of FIGURE 1.

As shown in FIGURE 3, the two shafts 32, **32*a* engage the tape 16 on either side of the transducer heads 14. This, as mentioned above, is advantageous in that it assures that the tape will be drawn across the faces of the transducer heads without speed variations due to changes in elasticity of the tape. The assembly of FIGURE 3 includes a pair of puck assemblies 60 and 62. In accordance with well knonw practice, these assemblies can be moved from a stand-by position to a position in which associated rotatably mounted pucks press the tape against the corresponding shafts 32. In this manner, the shafts 32** are enabled to draw the tape along its predetermined path.

The invention provides, therefore, an improved simplified construction for a capstan mechanism for use in a magnetic tape recorder. The improved mechanism of the invention incorporates a pair of capstan drive shafts which are displaced from one another for the reasons outlined above.

The improved mechanism of the invention is constructed to incorporate hollow shafts, which are rigidly supported on central stationary shafts, in a manner such that cantilever effects are prevented. The assembly of the invention is also constructed such that magnetic recordings may be made on the rims of the shafts, to be sensed by associated transducer heads for speed control purposes.

While a particular embodiment of the invention has been shown and described, modifications may be made, and it is intended in the claims to cover such modifications which fall within the scope of the invention.

What is claimed is:

1. A capstan drive assembly including: a stationary housing; first and second stationary shafts mounted in said housing and extending out of said housing along respective first and second spaced parallel axes; first and second hollow capstan shafts rotatably supported on respective ones of said stationary shafts for rotation about corresponding ones of said axes and extending out of said housing; first and second electric motor armatures respectively affixed to said hollow capstan shafts and positioned in said housing; and first and second groups of magnets mounted in said housing, said groups being respectively disposed around said first and second axes in magnetically coupled relationship with respective ones of said armatures to produce rotatable movement of said armatures and of said hollow capstan shafts about corresponding ones of said axes.

2. A capstan drive assembly including: a stationary housing; first and second stationary shafts mounted in said housing and extending out of said housing along respective first and second spaced parallel axes; first and second holow shafts rotatably supported on respective ones of said stationary shafts for rotation about said first and second axes and extending out of said housing; first and second disc-shaped printed circuit electric motor armatures respectively affixed to the ends of said hollow shafts and positioned in said housing; and first and second groups of permanent magnets mounted in said housing, said groups being disposed around respective ones of said axes in magnetically coupled relationship with corresponding ones of said armatures to produce rotatable movement of said armatures and of said hollow capstan shafts about respective ones of said axes.

3. A capstan drive assembly including: a stationary housing; first and second stationary shafts mounted in said housing and extending out of said housing along respective spaced and parallel axes; first and second hollow capstan shafts rotatably supported on respective ones of said first and second stationary shafts for rotation about respective ones of said axes and extending out of said housing, the end of each of said stationary shafts remote from said housing protruding beyond the ends of the corresponding ones of said hollow shafts; first and second electric motor armatures affixed to respective ones of said hollow shafts and positioned in said housing; first and second groups of magnets mounted in said housing, said groups being disposed around respective ones of said axes in magnetically coupled relationship with corresponding ones of said armatures to produce rotatable movement of said armatures and of said hollow capstan shafts about said axes; and a bracket mounted on said housing and affixed to said remote ends of said first and second stationary shafts to clamp the ends of said shafts and prevent cantilever effects therein.

References Cited by the Examiner

UNITED STATES PATENTS

| | | | |
|---|---|---|---|
| 2,104,707 | 1/1938 | Rawlings. | |
| 2,658,157 | 11/1953 | Bronwer | 310—268 |
| 2,727,163 | 12/1955 | Meyer | 310—268 |
| 3,023,335 | 2/1962 | Burr | 310—268 |
| 3,093,763 | 6/1963 | Sargeant | 310—268 |
| 3,095,516 | 6/1963 | Moressee | 310—268 |
| 3,178,599 | 4/1965 | Krupick | 310—154 |

FOREIGN PATENTS

| | | |
|---|---|---|
| 1,040,988 | 10/1953 | France. |

ORIS L. RADER, *Primary Examiner.*

JOHN F. COUCH, MILTON O. HIRSHFIELD, *Examiners.*

J. W. GIBBS, *Assistant Examiner.*